US 8,041,391 B2

(12) United States Patent
Naruse et al.

(10) Patent No.: US 8,041,391 B2
(45) Date of Patent: Oct. 18, 2011

(54) MOBILE COMMUNICATION TERMINAL AND TERMINAL CONTROL METHOD

(75) Inventors: Naoki Naruse, Yokohama (JP); Hisashi Yoshinaga, Yokohama (JP); Mao Asai, Kawasaki (JP); Fukiko Takayama, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 901 days.

(21) Appl. No.: 11/865,379

(22) Filed: Oct. 1, 2007

(65) Prior Publication Data

US 2008/0081668 A1 Apr. 3, 2008

(30) Foreign Application Priority Data

Oct. 3, 2006 (JP) ................. P2006-271978

(51) Int. Cl.
*H04B 1/38* (2006.01)
(52) U.S. Cl. ............. 455/558; 455/550.1; 455/411
(58) Field of Classification Search ........... 455/550.1, 455/448, 411
See application file for complete search history.

(56) References Cited

U.S. PATENT DOCUMENTS

| 6,925,560 | B1 | 8/2005 | Basquin | |
|---|---|---|---|---|
| 2004/0162057 | A1* | 8/2004 | Steininger | 455/411 |
| 2004/0209651 | A1* | 10/2004 | Tsukamoto | 455/558 |
| 2005/0075092 | A1* | 4/2005 | Kim | 455/411 |
| 2005/0164738 | A1* | 7/2005 | Liu | 455/558 |

FOREIGN PATENT DOCUMENTS

| EP | 1 441 553 A2 | 7/2004 |
|---|---|---|
| JP | 2003-58970 | 2/2003 |
| JP | 2003-114829 | 4/2003 |
| JP | 2003-150457 | 5/2003 |
| JP | 2003-188791 | 7/2003 |
| JP | 2004-70727 | 3/2004 |
| JP | 2005-223785 | 8/2005 |
| JP | 2006-13659 | 1/2006 |
| JP | 2006-319438 | 11/2006 |

OTHER PUBLICATIONS

Chinese Office Action issued on May 25, 2011 in corresponding Chinese Application No. 200710162004.X (with an English Translation).

* cited by examiner

*Primary Examiner* — Patrick Edouard
*Assistant Examiner* — Aung Win
(74) *Attorney, Agent, or Firm* — Oblon, Spivak, McClelland, Maier & Neustadt, L.L.P.

(57) ABSTRACT

An object of the present invention is to surely and readily prevent unauthorized use of a noncontact IC function incorporated in a mobile communication terminal, even in a state in which no signal can be sent through mobile communication to the mobile communication terminal. A mobile communication terminal 10 has a noncontact IC module 12 incorporating an IC chip 11; a slot 13 in which a UIM 20 is to be loaded, the UIM 20 storing connection information to be used for connection between the host terminal 10 and a mobile communication network; a memory unit 15 for storing information to identify UIM 20; an acquiring unit 16 for acquiring information to identify UIM 20 loaded in the slot 13; a comparing unit 17 for making a comparison between the information to identify the UIM 20, stored in the memory unit 15, and the information to identify the UIM 20, acquired by the acquiring unit 16; and a control unit 18 for controlling access to the IC chip 11, based on a result of the comparison by the comparing unit 17.

5 Claims, 5 Drawing Sheets

MOBILE COMMUNICATION TERMINAL AND TERMINAL CONTROL METHOD

BACKGROUND OF THE INVENTION

1. Field of the Invention

The present invention relates to a mobile communication terminal incorporating a noncontact IC function like a noncontact IC (Integrated Circuit) card, and a terminal control method in the mobile communication terminal.

2. Related Background of the Invention

It is conventionally performed to incorporate a noncontact IC function like a noncontact IC card, in a mobile communication terminal such as a cell phone. This noncontact IC function is used as a function of e-money, a credit card, or a commuter pass. There are proposals on the technology for preventing unauthorized use of this function by a third party, for example, in the case where the mobile communication terminal is lost. For example, Japanese Patent Application Laid-open No. P2006-13659A (Patent Document 1) describes a method of preliminarily setting an operation inhibition flag to inhibit the noncontact IC function, and restricting the noncontact IC function thereby. Another Japanese Patent Application Laid-open No. P2006-58970A (Patent Document 2) describes a method of letting an IC card store such conditions as a use place, a use time zone, and use contents and restricting the function of the IC card on the basis of the conditions.

SUMMARY OF THE INVENTION

However, the method described in Patent Document 1 involves the trouble of preliminarily setting the flag and, without setting of the flag, it is infeasible to prevent unauthorized use. The method described in Patent Document 2 permits use of the noncontact IC function only under the preset conditions and allows unauthorized use as long as the conditions are met.

Besides the preventive measures against unauthorized use as described above, there is a method of transmitting a signal to lock the noncontact IC function, to the mobile communication terminal, for example, by SMS (Short Message Service) or the like, and thereby locking the noncontact IC function incorporated in the mobile communication terminal. This method has the advantage that the unauthorized use can be prevented without the need for the preliminary setting described in the foregoing Patent Documents 1 and 2.

Even with the method of transmitting the signal to lock the noncontact IC function, to the mobile communication terminal, however, it becomes impossible to send the signal from a mobile communication network to the mobile communication terminal if a subscriber authentication module, e.g., UIM (User Identity Module), loaded on the mobile communication terminal is replaced with another except for the one of the user of the mobile communication terminal, and it results in failure in prevention of unauthorized use.

The present invention has been accomplished in order to solve the above problem and an object of the invention is to provide a mobile communication terminal and terminal control method capable of surely and readily preventing unauthorized use of the noncontact IC function incorporated in the mobile communication terminal, even in a state in which no signal can be sent through mobile communication to the mobile communication terminal.

In order to achieve the above object, a mobile communication terminal according to the present invention comprises a noncontact IC module incorporating an IC chip; a mount part on which a subscriber authentication module is to be loaded, wherein the subscriber authentication module stores connection information to be used for connection between the host terminal and a mobile communication network; a memory unit for storing information to identify a subscriber authentication module; acquiring means for acquiring information to identify a subscriber authentication module loaded on the mount part; comparing means for making a comparison between the information to identify the subscriber authentication module, stored in the memory unit, and the information to identify the subscriber authentication module, acquired by the acquiring means; and control means for controlling access to the IC chip, based on a result of the comparison by the comparing means.

The mobile communication terminal according to the present invention is able to inhibit access to the IC chip unless the subscriber authentication module associated with the information stored in the memory unit is loaded. Therefore, the mobile communication terminal according to the present invention is able to surely prevent unauthorized use of the noncontact IC function incorporated in the mobile communication terminal, even in a state in which no signal can be sent through mobile communication to the mobile communication terminal because the mobile communication terminal is loaded with another subscriber authentication module different from that associated with the information stored in the memory unit.

Since the mobile communication terminal according to the present invention normally performs the control using the subscriber authentication module used in the mobile communication terminal, it is able to readily prevent the unauthorized use of the noncontact IC function incorporated in the mobile communication terminal.

It is preferable to adopt the following configuration: the mobile communication terminal further comprises registering means for, when an application software to access the IC chip is first activated or downloaded in the host terminal, acquiring the information to identify the subscriber authentication module loaded on the mount part, and storing the information in the memory unit. This configuration eliminates a need for an operation for storing the information to identify the subscriber authentication module, in the memory unit, and is thus able to improve convenience.

It is preferable to adopt the following configuration: as triggered by power-on of the host terminal or start of power supply to the IC chip, the acquiring means acquires the information to identify the subscriber authentication module loaded on the mount part. This configuration allows the terminal to perform the control on access to the IC chip at appropriate timing, and is thus able to more surely prevent the unauthorized use of the noncontact IC function incorporated in the mobile communication terminal.

It is preferable to adopt the following configuration: the control means configures a setting for inhibition of access to a memory area of the IC chip and, when the setting is configured, the control means performs a control to inhibit access to the IC chip. This configuration permits sure implementation of the present invention.

It should be noted herein that the present invention can also be described as the invention of a terminal control method as below, as well as it can be described as the invention of the mobile communication terminal as above. This is different only in category and substantially the same invention, with the same action and effect.

Namely, a terminal control method according to the present invention is a terminal control method in a mobile communication terminal comprising a noncontact IC module incorporating an IC chip, a mount part on which a subscriber authentication module is to be loaded, the subscriber authentication module storing connection information to be used for connection between the host terminal and a mobile communication network, and a memory unit for storing information to identify a subscriber authentication module, the terminal control method comprising: an acquisition step of acquiring information to identify a subscriber authentication module loaded on the mount part; a comparison step of making a comparison between the information to identify the subscriber authentication module, stored in the memory unit, and the information to identify the subscriber authentication module, acquired in the acquisition step; and a control step of controlling access to the IC chip, based on a result of the comparison in the comparison step.

The present invention is able to inhibit access to the IC chip unless the subscriber authentication module associated with the information stored in the memory unit is loaded. Therefore, the present invention is able to surely prevent unauthorized use of the noncontact IC function incorporated in the mobile communication terminal, even in a state in which no signal can be sent through mobile communication to the mobile communication terminal because the mobile communication terminal is loaded with another subscriber authentication module different from that associated with the information stored in the memory unit. Since the control is normally performed using the subscriber authentication module used in the mobile communication terminal, the present invention is able to readily prevent the unauthorized use of the noncontact IC function incorporated in the mobile communication terminal.

DESCRIPTION OF THE PREFERRED EMBODIMENTS

The preferred embodiments of the mobile communication terminal and terminal control method according to the present invention will be described below in detail with reference to the drawings. The same elements will be denoted by the same reference symbols throughout the description of the drawings, without redundant description.

Figure 1:
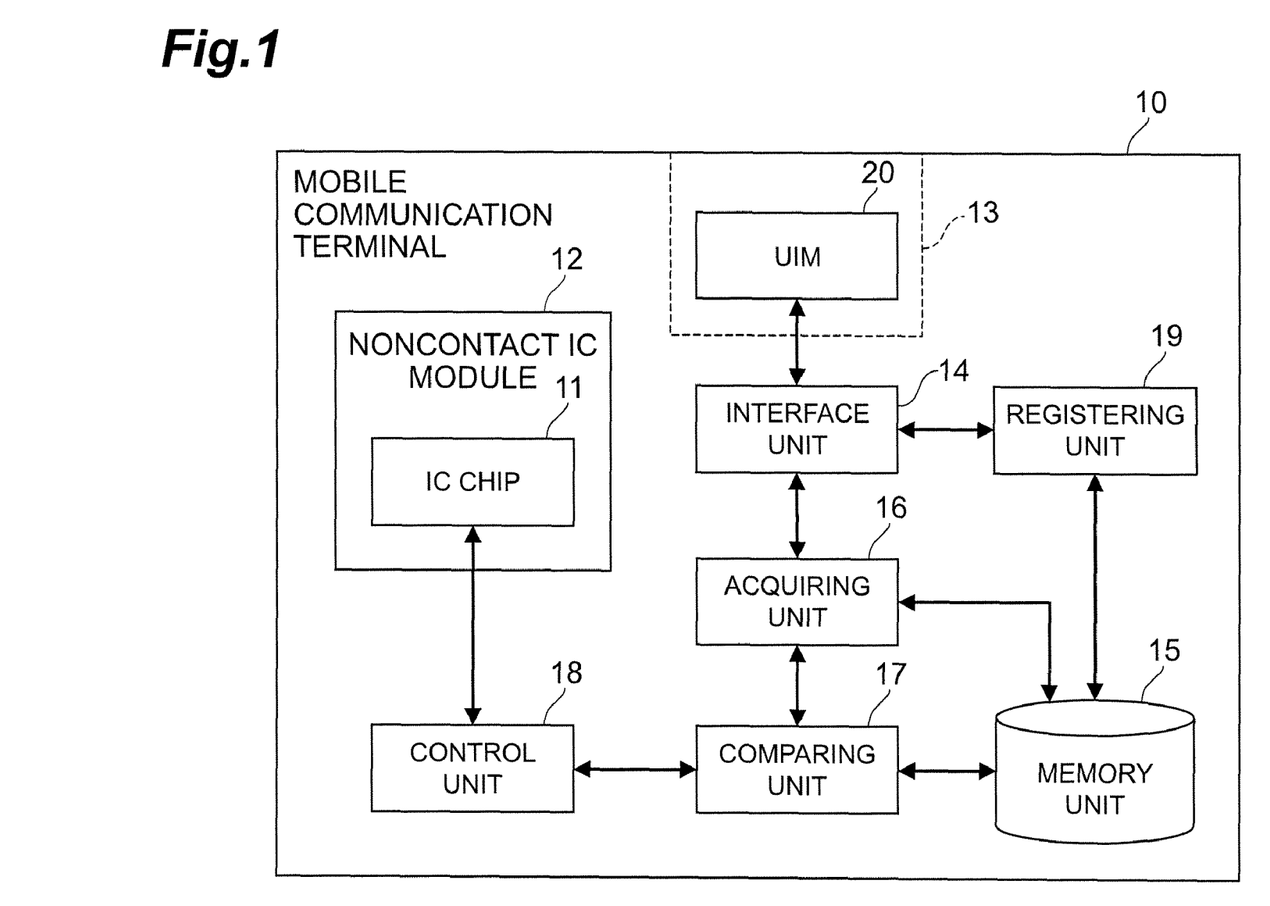
FIG. 1 is a drawing showing a functional configuration of a mobile communication terminal according to an embodiment of the present invention.

FIG. 1 shows the configuration of mobile communication terminal 10 according to the present embodiment. The mobile communication terminal 10 is a device that has a function to connect to a mobile communication network such as a cell phone network and implement mobile communication. For implementing the mobile communication, the mobile communication terminal 10 needs to be loaded with a UIM 20, which is a subscriber authentication module. The UIM 20 stores connection information to be used for connection between the host terminal 10 and the mobile communication network. The connection information is such information as a telephone number, an algorithm and a private key for authorization to be used in connection to the mobile communication network. The UIM 20 has information to identify itself. Specifically, this information is comprised, for example, of a character string of multiple characters and is set as a unique one so as not to coincide with those of the other UIMs 20, for example, when manufactured.

The mobile communication terminal 10 is a device that has the noncontact IC function, as described below. As shown in FIG. 1, the mobile communication terminal 10 has IC chip 11, noncontact IC module 12, slot 13, interface unit 14, memory unit 15, acquiring unit 16, comparing unit 17, control unit 18, and registering unit 19. The above-described components of the mobile communication terminal 10 are associated with the function according to the present invention. In addition to it, the mobile communication terminal 10 also has components associated with the function to implement mobile communication, and other functions, which are not depicted.

The IC chip 11 has a calculation function, a memory function, etc., and is equipped with the noncontact IC function. This function is available, for example, for the e-money function, the credit card function, the traffic ticket or commuter pass function, and such personal identification-authentication functions as the admission card or employee ID card function, and so on. These functions of IC chip 11 are implemented through access to the IC chip 11 from applications (not shown) for the noncontact IC function in the mobile communication terminal 10 (which will be referred to as IC applications).

The supply of power can be individually turned on and off to the IC chip 11 while the power of the mobile communication terminal 10 is on. Namely, it is feasible to hold a state in which the supply of power to the IC chip 11 is off while the power of the mobile communication terminal 10 itself is on. In this case, the mobile communication terminal 10 is able to perform mobile communication but is unable to use the noncontact IC function.

The noncontact IC module 12 incorporates the IC chip 11 and has a noncontact type communication function. Specifically, the noncontact IC module 12 is composed of an antenna for transmission and reception of radio waves for the noncontact IC function, a modem for modulation and demodulation of radio waves and signals, and so on. The noncontact IC module 12 implements the aforementioned noncontact IC function.

The slot 13 is a mount part on which UIM 20 is to be loaded. The slot 13 is internally provided with terminals for connection with UIM 20. The interface unit 14 is a part for transmission and reception of information to and from UIM 20 set and connected in the slot 13.

The memory unit 15 is a part that stores information to identify UIM 20. The information to identify UIM 20 is, for example, a character string uniquely defined for each UIM 20 described above (which will be referred to as UIM information). Specifically, the UIM information is stored as located at a predetermined storage position on the memory for management of IC applications. In the mobile communication terminal 10 of the present embodiment, access to the IC chip 11 is allowed only when the UIM 20 corresponding to the UIM information stored in the memory unit 15 is loaded. Therefore, the UIM information stored in the memory unit 15 is usually information associated with the UIM 20 owned by the user of the mobile communication terminal 10.

The acquiring unit 16 is an acquiring means for acquiring the UIM information about the UIM 20 loaded in the slot 13. Specifically, the acquiring unit 16 acquires the UIM information by reading it from the UIM 20 through the interface unit 14. The read UIM information is fed to the comparing unit 17.

The comparing unit 17 is a comparing means for reading the UIM information stored in the memory unit 15 and making a comparison between the read UIM information and the UIM information acquired and fed by the acquiring unit 16. The control unit 18 is notified of the result of the comparison by the comparing unit 17, i.e., whether the two pieces of UIM information agree.

The control unit 18 is a control means for controlling access to the IC chip 11, based on the result of the comparison by the comparing unit 17. Specifically, when the two pieces of UIM information agree, access to the IC chip 11 is allowed; when they disagree, access to the IC chip 11 is inhibited. The access to be controlled herein includes both of access by the noncontact IC module 12 (i.e., access form a wireless communication interface) and access from the interior of the mobile communication terminal 10 (i.e., access from a wire communication interface).

Figure 2:
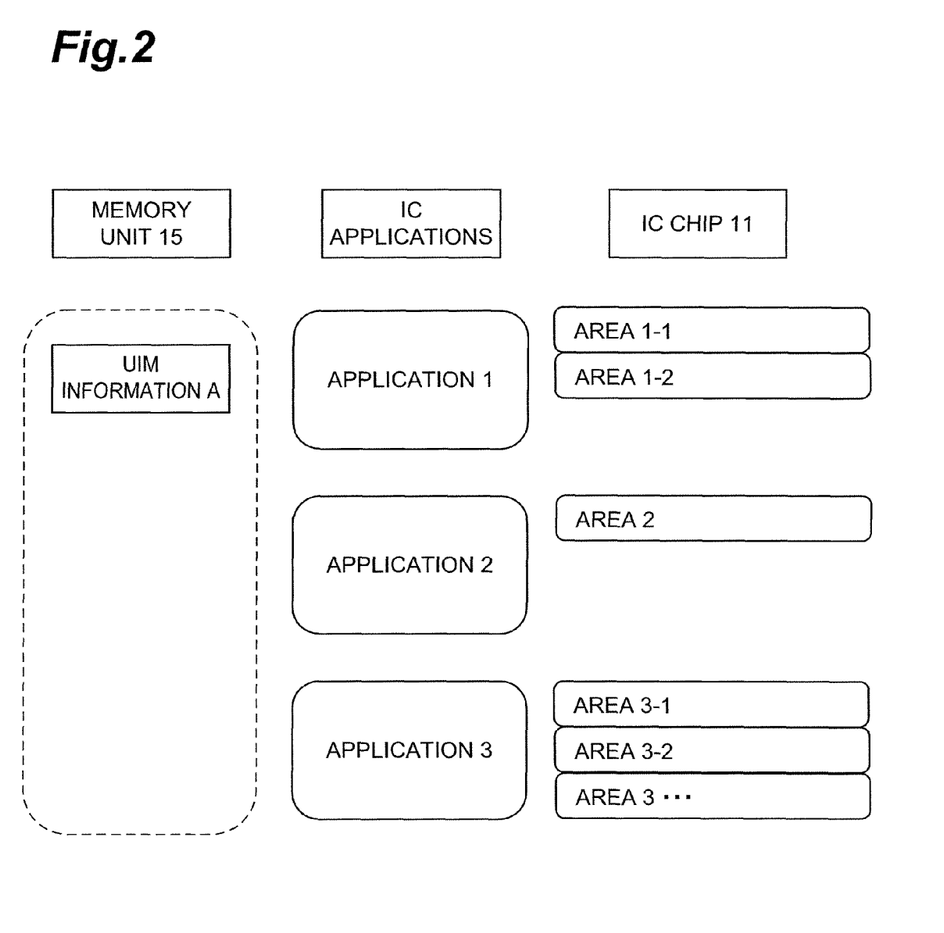
FIG. 2 is a drawing showing a state of a memory unit, IC applications, and an IC chip in a mobile communication terminal.
Figure 3:
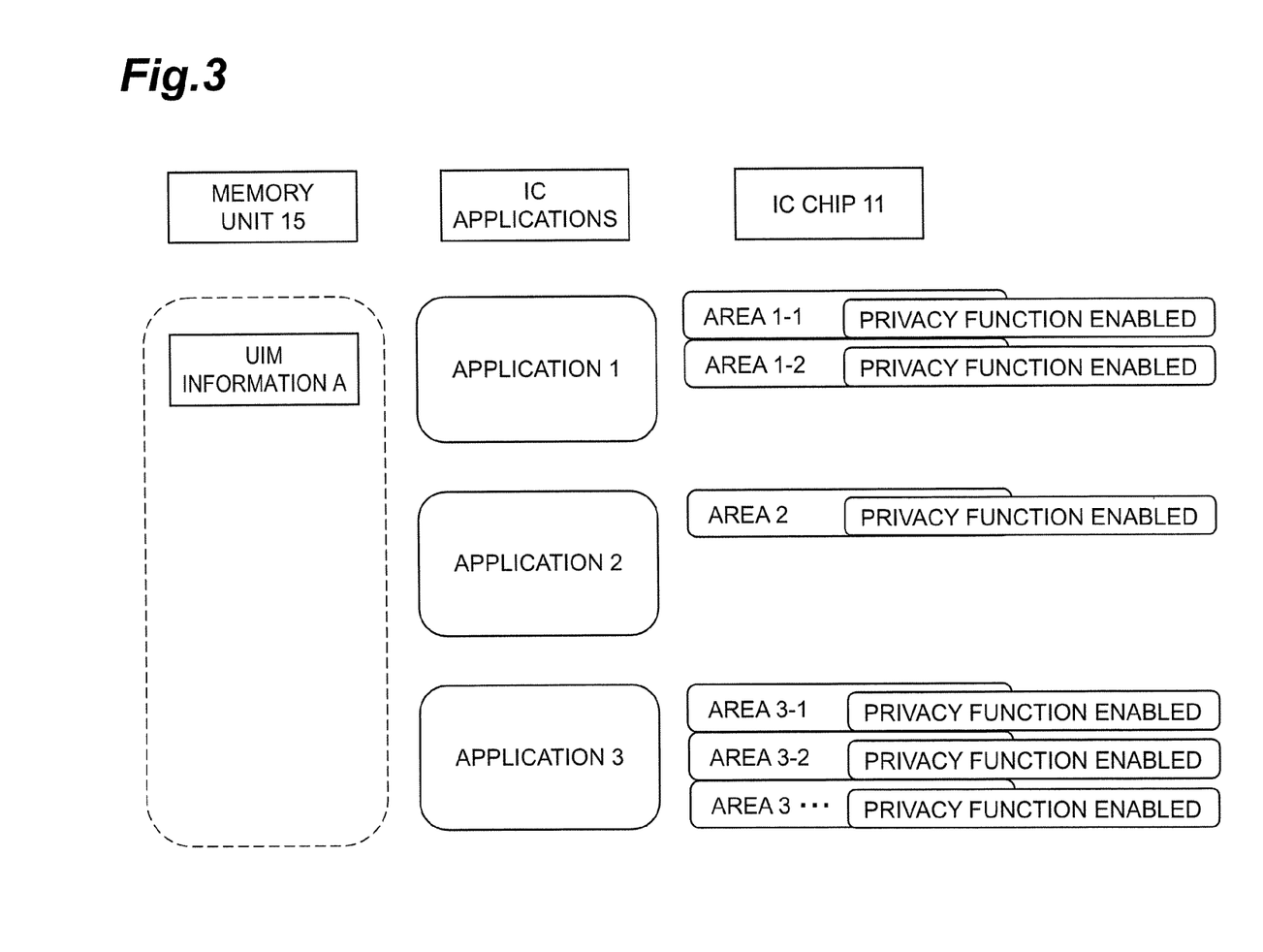
FIG. 3 is a drawing showing another state of a memory unit, IC applications, and an IC chip in a mobile communication terminal.

The control to inhibit the access by the control unit 18 is carried out, for example, as follows: a setting to inhibit access is configured in each memory area of the IC chip 11 as shown in FIG. 3 and access is monitored to each memory area with the inhibition setting. To configure the setting to inhibit access herein will be called "to enable the privacy function." As shown in FIGS. 2 and 3, a memory area or memory areas are secured for each of IC applications, and the privacy function is enabled for each secured area. For example, as shown in FIG. 2, "area 1-1" and "area 1-2" of memory areas of the IC chip 11 are assigned and secured for "Application 1" of an IC application. As shown in FIG. 3, the setting to inhibit access is configured in each of "area 1-1" and "area 1-2" (and is also configured in the memory areas corresponding to the IC applications other than "Application 1").

The registering unit 19 is a registering means for acquiring UIM information and storing the UIM information in the memory unit 15 to register it. The registration of UIM information is performed when an IC application is first activated or downloaded in the mobile communication terminal 10. Specifically, the registering unit 19 monitors the activation or download of an IC application. When an IC application is first activated or downloaded, the registering unit 19 acquires the UIM information from the UIM 20 loaded in the slot 13 and stores the UIM information in the memory unit 15.

The registration by the registering unit 19 is based on the assumption that the terminal is loaded with the UIM 20 of the user duly authorized to utilize the noncontact IC function, at the time of the first activation or download of an IC application. This configuration eliminates a need for an operation for storing the UIM information in the memory unit 15, and thus improves convenience. It is, however, noted that the registration does not always have to be done automatically as described above but the registration of UIM information in the memory unit 15 may also be done, for example, by a user's operation. The above described the functional configuration of the mobile communication terminal 10.

Figure 4:
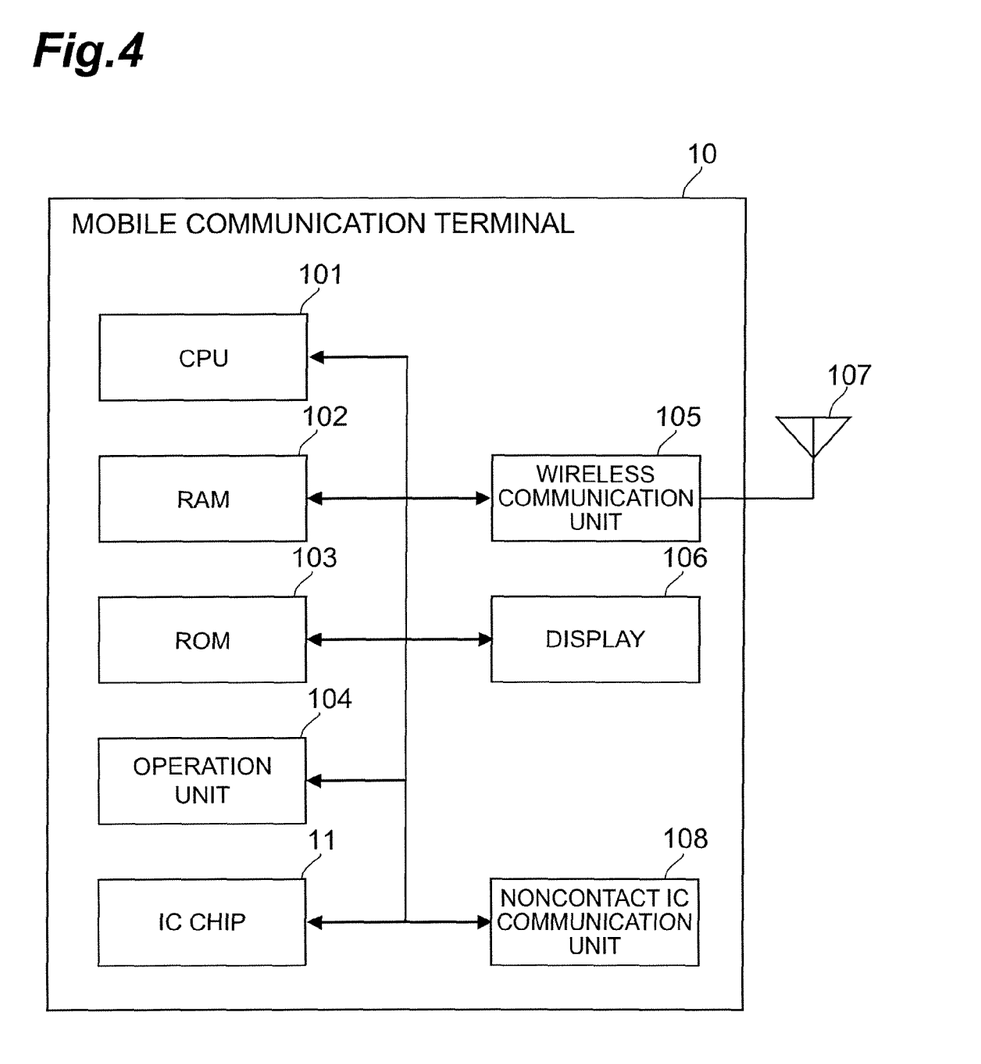
FIG. 4 is a drawing showing a hardware configuration of a mobile communication terminal according to an embodiment of the present invention.

FIG. 4 shows a hardware configuration of mobile communication terminal 10. As shown in FIG. 4, the mobile communication terminal 10 is composed of hardware including CPU (Central Processing Unit) 101, RAM (Random Access Memory) 102, ROM (Read Only Memory) 103, operation unit 104, wireless communication unit 105, display 106, antenna 107, and so on. In addition thereto, the mobile communication terminal 10 has hardware of IC ship 11 and noncontact IC communication unit 108 as noncontact IC module 12. Each of the functions of the mobile communication terminal 10 described above is exercised by operation of these components.

Figure 5:
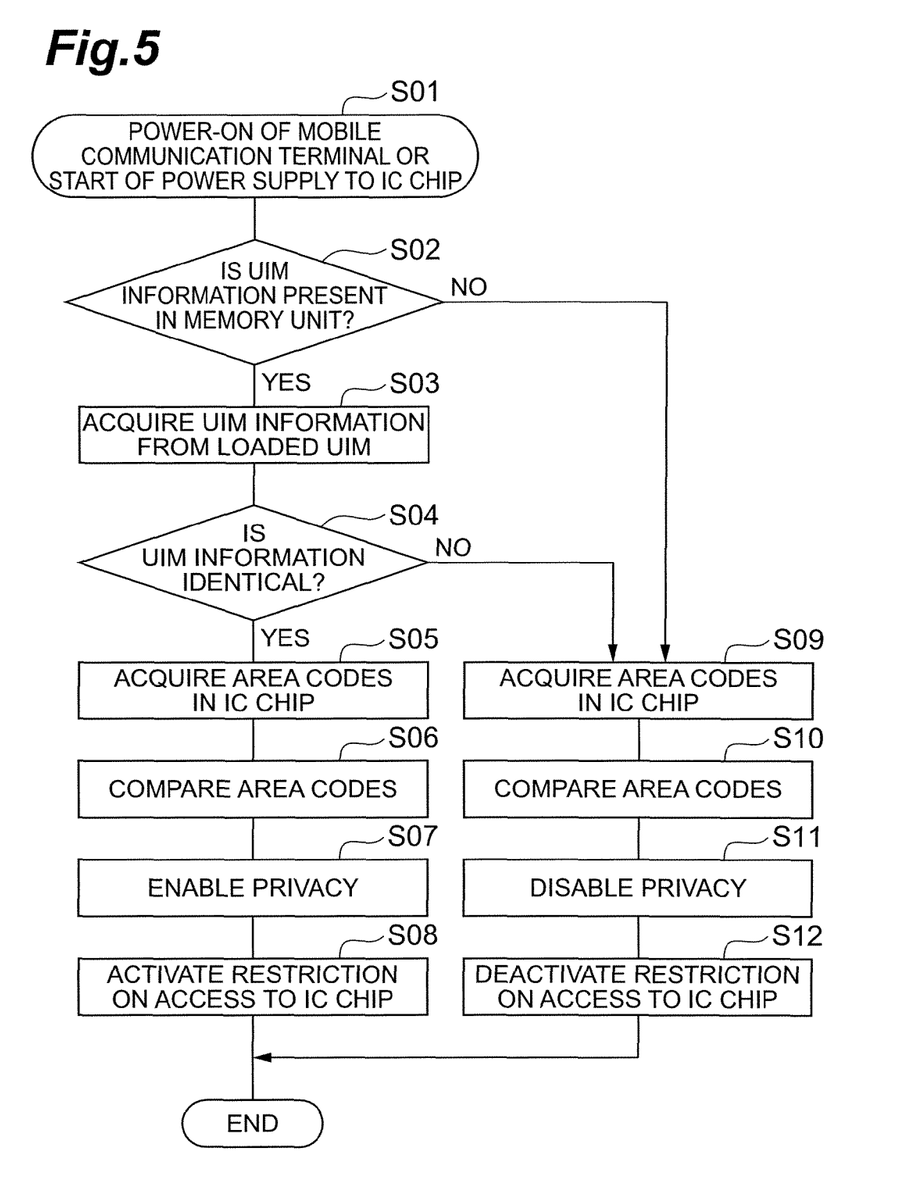
FIG. 5 is a flowchart showing a processing procedure (terminal control method) executed in a mobile communication terminal according to an embodiment of the present invention.

Subsequently, the processing (terminal control method) executed in the mobile communication terminal 10 according to the present embodiment will be described using the flowchart of FIG. 5. This processing is initiated as triggered by power-on of the mobile communication terminal 10 or start of power supply to the IC chip 11 (S01). When the power of the mobile communication terminal 10 is turned on, the supply of power is started to the IC chip 11 at the same time (the power is never turned on without supply of power to the IC chip 11). The power-on of the mobile communication terminal 10 or the start of power supply to the IC chip 11 is detected, for example, by the acquiring unit 16.

When the acquiring unit 16 detects the aforementioned trigger, the acquiring unit 16 refers to the memory unit 15 and determines whether the UIM information is stored in the memory unit 15 (S02). When the UIM information is stored in the memory unit 15, the acquiring unit 16 acquires the UIM information from the UIM 20 loaded on the mobile communication terminal 10 (S03, acquisition step). The acquired UIM information is fed to the comparing unit 17.

Subsequently, the comparing unit 17 acquires the UIM information stored in the memory unit 15. Then the comparing unit 17 makes a comparison to determine whether the UIM information stored in the memory unit 15 agrees with the UIM information acquired by the acquiring unit 16 (S04, comparison step). For example, in a case where the UIM information acquired by the acquiring unit 16 is "UIM information B" and where the UIM information stored in the memory unit 15 is "UIM information A" as shown in FIG. 3, the comparing unit 17 determines that the two pieces of UIM information disagree.

When disagreement is determined, the comparing unit 17 notifies the control unit 18 of the fact and the control unit 18 performs the control to inhibit access to the IC chip 11, for example, as described below. It is also preferable to perform the control to inhibit access to the IC chip 11, in the same manner when the acquiring unit 16 fails to acquire the UIM information in S03, for example, because of the absence of UIM 20 on the mobile communication terminal 10. The reason is that it can be determined in that case that the UIM 20 of the user duly authorized to use the noncontact IC function is not loaded.

First, the control unit 18 acquires from the IC chip 11 area codes being information to identify memory areas of the IC chip 11 (S05, control step). For example, in the example of FIG. 2, such information as "area 1-1," "area 1-2," and "area 2" is acquired. The area codes are also sometimes called service codes.

Next, the control unit 18 acquires area codes to identify memory areas of the IC chip 11 that the IC applications stored in the mobile communication terminal 10 access. This acquisition is implemented by reference to management information of the IC applications stored in the mobile communication terminal 10 (access to the IC chip 11 is not performed during this acquisition). The area codes acquired herein are compared with the area codes of the IC chip 11 (which were acquired in S05) (S06, control step).

Then the control unit 18 performs the control to inhibit access to memory areas of the IC chip 11 identified by area codes indicating agreement in the foregoing comparison. Specifically, as shown in FIG. 3, the privacy function is enabled in each memory area of the IC chip 11 (S07, control step).

The above processing of steps (S05-S07) for the IC chip 11 is carried out for effecting the control on the memory areas showing agreement between the memory areas set as memory areas accessed from the IC applications, in the IC chip 11 and the memory areas of the IC chip 11 as access targets set by the IC applications. The area codes of the IC chip 11 usually agree with the area codes set by the IC applications, but there are cases where they disagree, for example, where the setting from an IC application to the IC chip 11 is not configured. It is sufficient that the control is performed only for the memory areas indicating agreement of area codes.

The processing (S05-S07) for the IC chip 11 is executed as a command is issued to the IC chip 11. If the command is not executed due to an access conflict or the like in execution of this command, the command is retransmitted to continue the processing.

This control ends in a state of inhibiting access to the IC chip 11 (S08, control step). As described above, the inhibition is effected on both of access by the noncontact IC module 12 and access from the interior of the mobile communication terminal 10. It is preferable to perform a control to inhibit the download, activation, and version upgrade of IC applications as well during access restricted periods. As for deletion of an IC application, it is preferable to perform a control to inhibit deletion of an application that needs to access the IC chip 11 during the deletion. When the power of the mobile communication terminal 10 is turned off, the restricted state right before the power-off is held. The above described the processing carried out when the two pieces of UIM information disagree in S04.

On the other hand, for example, in a case where the UIM information acquired by the acquiring unit 16 is "UIM information A" and where the UIM information stored in the memory unit 15 is "UIM information A" as shown in FIG. 3, the comparing unit 17 determines in S04 that the two pieces of UIM information agree. When they are determined to agree, the comparing unit 17 notifies the control unit 18 of the fact and the control unit 18 performs a control to permit access to the IC chip 11, for example, as described below. This control is also carried out in the same manner when it is determined in S02 that the UIM information is absent in the memory unit 15. The reason is that it can be determined in that case that there is no extra setting.

First, as in S05, the control unit 18 acquires the area codes being information to identify the memory areas of the IC chip 11, from the IC chip 11 (S09, control step). Next, as in S06, the control unit 18 acquires the area codes to identify the memory areas of the IC chip 11 that the IC applications stored in the mobile communication terminal 10 access. A comparison is made between the area codes acquired herein and the area codes of the IC chip 11 (acquired in S09) (S10, control step).

Subsequently, the control unit 18 performs a control to permit access to memory areas of the IC chip 11 identified by area codes indicating agreement in the above comparison. Specifically, the privacy function is disabled in each memory area of the IC chip 11 (S11, control step). If the privacy function is disabled before this processing, no special processing is needed.

This control ends in a state of permitting access to the IC chip 11 (S12, control step). Namely, the terminal goes into a state in which no extra control is effected on access to the IC chip 11. The above described the processing carried out when the comparing unit 17 determines in S04 that the two pieces of UIM information agree.

In the mobile communication terminal 10 of the present embodiment, the access to the IC chip 11 can be inhibited unless the terminal is loaded with the UIM 20 associated with the UIM information stored in the memory unit 15. Therefore, when the memory unit 15 is preliminarily arranged to store the information to identify the UIM 20 of the user duly authorized to use the noncontact IC function, the access to the IC chip 11 is inhibited when another UIM 20 is loaded on the mobile communication terminal 10 (by a person intending to make unauthorized use). This also enables the mobile communication terminal 10 of the present embodiment to surely prevent the unauthorized use of the noncontact IC function incorporated in the mobile communication terminal 10, even in a state in which no signal can be sent through mobile communication to the mobile communication terminal 10 because the mobile communication terminal 10 is loaded with another UIM 20 different from the UIM 20 associated with the UIM information stored in the memory unit 15.

Since the mobile communication terminal 10 of the present embodiment is arranged to perform the control using the UIM 20 usually used in the mobile communication terminal 10, the terminal is able to readily prevent the unauthorized use of the noncontact IC function incorporated in the mobile communication terminal 10.

As long as the terminal is loaded with the UIM 20 associated with the UIM information stored in the memory unit 15, the unauthorized use can be prevented by sending the signal to lock the noncontact IC function, through mobile communication to the mobile communication terminal 10, as described above.

In the mobile communication terminal 10 of the present embodiment, the processing is initiated at the timing of power-on of the mobile communication terminal 10 or start of power supply to the IC chip 11 (the acquiring unit 16 acquires the UIM information of the UIM 20 loaded on the mobile communication terminal 10). These timings are timings when the noncontact IC function can be initiated in the mobile communication terminal 10. When the processing is initiated at this timing, the control on the access to the IC chip 11 can be done at appropriate timing and thus the unauthorized use of the noncontact IC function can be prevented more securely. It is, however, noted that the processing does not always have to be initiated at the aforementioned timing but the processing may be executed at any timing (e.g., at certain time intervals or the like).

In the mobile communication terminal 10 of the present embodiment, the control to inhibit the access to the IC chip 11 is effected by enabling the privacy function. This configuration permits sure implementation of the present invention. However, the control to inhibit the access does not always have to be performed by the above-described method, but it is also possible to adopt a method of inhibiting the access, for example, by inhibiting supply of power to the IC chip 11.

The subscriber authentication module in the present embodiment was the UIM 20, but it is also possible to use any other subscriber authentication module, e.g., SIM (Subscriber Identity Module).

What is claimed is:
1. A mobile communication terminal comprising:
a noncontact IC communication unit having an IC chip and an antenna for transmission and reception of radio waves for a noncontact IC function, the IC chip having a plurality of memory areas each being associated with a respective one of a plurality of application software stored on the mobile communication terminal;
a mount part configured to load a subscriber authentication module, the subscriber authentication module configured to store connection information used for connec- tion between the mobile communication terminal and a mobile communication network;

a memory unit for storing first identification information that identifies a subscriber authentication module;

acquiring means for acquiring information that identifies the subscriber authentication module currently loaded on the mount part;

comparing means for making a comparison between the first identification information stored in the memory unit, and the information that identifies the subscriber authentication module that is currently loaded on the mount part and was acquired by the acquiring means;

control means for controlling access to the IC chip of at least one of the plurality of application software, based on a result of the comparison by the comparing means, and based on whether a memory area of the IC chip that is associated with the at least one of the plurality of application software has a privacy function enabled which inhibits access to the memory area; and registering means for, when an application software, among the plurality of application software, to access the IC chip is first activated or downloaded in the mobile communication terminal, acquiring the information that identifies the subscriber authentication module that is currently loaded on the mount part, and storing the acquired information in the memory unit as the first identification information.

2. The mobile communication terminal according to claim 1, wherein after a power-on of the mobile communication terminal or a start of power supply to the IC chip, the acquiring means acquires the information to identify the subscriber authentication module currently loaded on the mount part.

3. The mobile communication terminal according to claim 1, wherein the control means is further configured to enable a privacy function of a memory area of the IC chip.

4. A terminal control method in a mobile communication terminal having a noncontact IC communication unit with an IC chip and an antenna for transmission and reception of radio waves for a noncontact IC function, the IC chip having a plurality of memory areas each being associated with a respective one of a plurality of application software stored on the mobile communication terminal, the mobile communication terminal further having a mount part configured to load a subscriber authentication module, the subscriber authentication module configured to store connection information used for connection between the mobile communication terminal and a mobile communication network, and a memory unit for storing first identification information that identifies a subscriber authentication module, the method comprising:

an acquisition step of acquiring information that identifies the subscriber authentication module currently loaded on the mount part;

a comparison step of making a comparison between the first identification information stored in the memory unit, and the information that identifies the subscriber authentication module that is currently loaded on the mount part and was acquired in the acquisition step;

a control step of controlling access to the IC chip of at least one of the plurality of application software, based on a result of the comparison in the comparison step and based on whether a memory area of the IC chip that is associated with the at least one of the plurality of application software has a privacy function enabled; and when an application software, among the plurality of application software, to access the IC chip is first activated or downloaded in the mobile communication terminal, acquiring the information that identifies the subscriber authentication module that is currently loaded on the mount part, and storing the acquired information in the memory unit as the first identification information.

5. A mobile communication terminal comprising:

a noncontact IC communication unit having an IC chip and an antenna for transmission and reception of radio waves for a noncontact IC function, the IC chip having a plurality of memory areas each being associated with a respective one of a plurality of application software stored on the mobile communication terminal;

a mount part configured to load a subscriber authentication module, the subscriber authentication module configured to store connection information used for connection between the mobile communication terminal and a mobile communication network;

a memory unit that stores first identification information that identifies a subscriber authentication module;

an acquiring unit that acquires information that identifies the subscriber authentication module currently loaded on the mount part;

a comparing unit that makes a comparison between the first identification information stored in the memory unit, and the information that identifies the subscriber authentication module that is currently loaded on the mount part and was acquired by the acquiring unit;

a controller that controls access to the IC chip of at least one of the plurality of application software, based on a result of the comparison by the comparing unit, and based on whether a memory area of the IC chip that is associated with the at least one of the plurality of application software has a privacy function enabled which inhibits access to the memory area; and a registering unit that, when an application software, among the plurality of application software, to access the IC chip is first activated or downloaded in the mobile communication terminal, acquires the information that identifies the subscriber authentication module that is currently loaded on the mount part, and stores the acquired information in the memory unit as the first identification information.

* * * * *